April 26, 1938.  L. H. MORSE ET AL  2,115,208
GAS METER
Filed Jan. 8, 1937  2 Sheets-Sheet 1
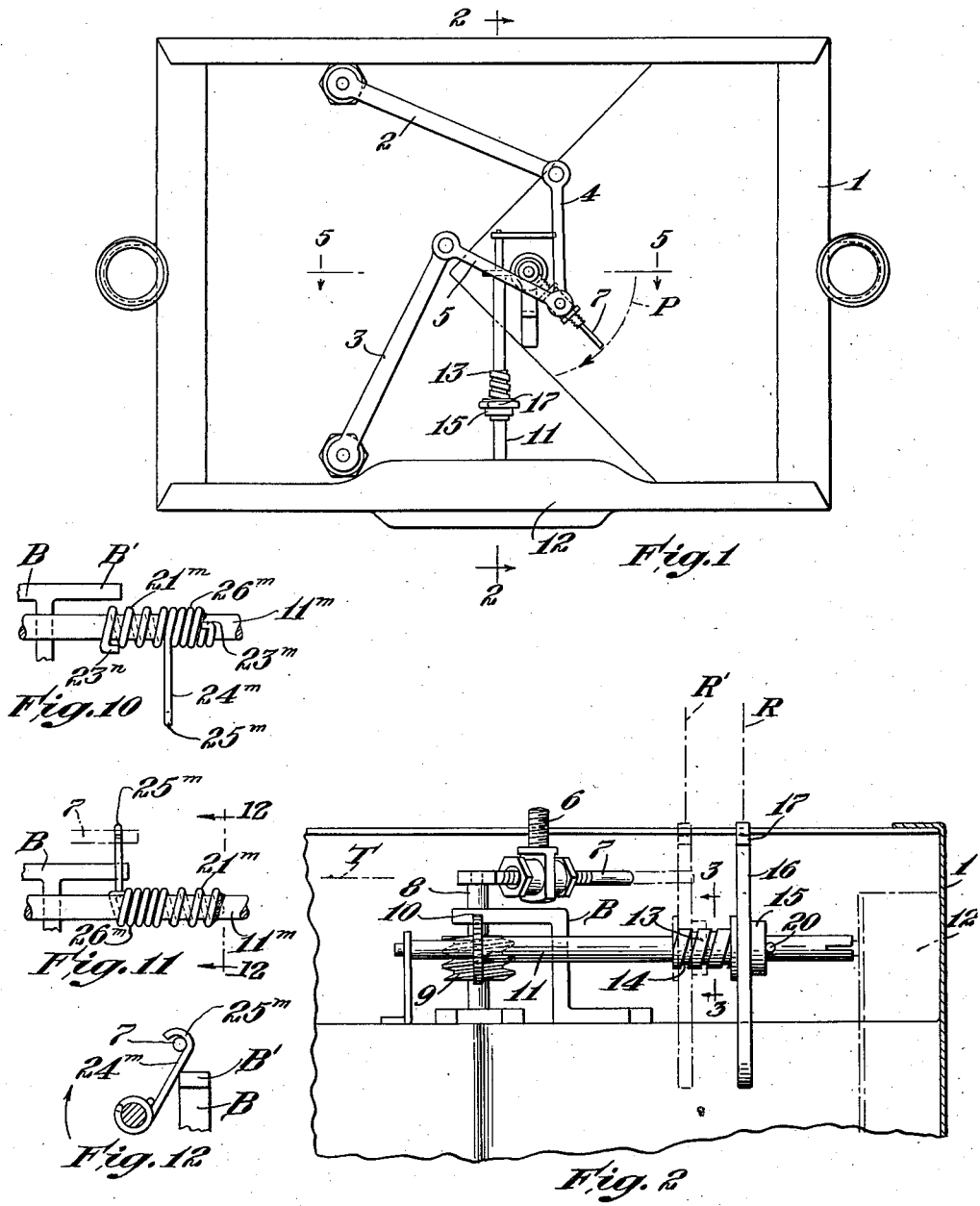

April 26, 1938.  L. H. MORSE ET AL  2,115,208
GAS METER
Filed Jan. 8, 1937  2 Sheets-Sheet 2
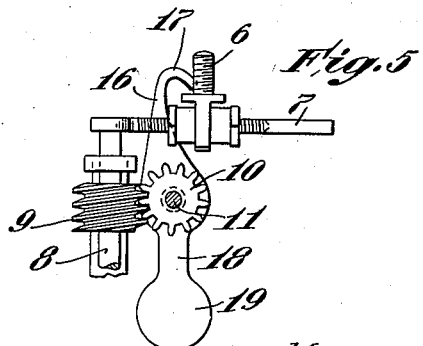
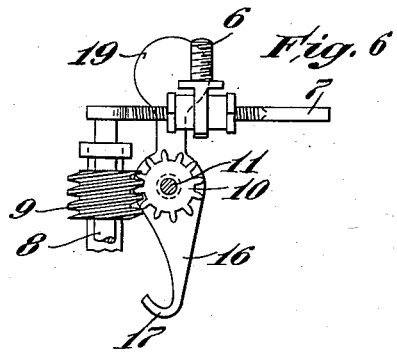
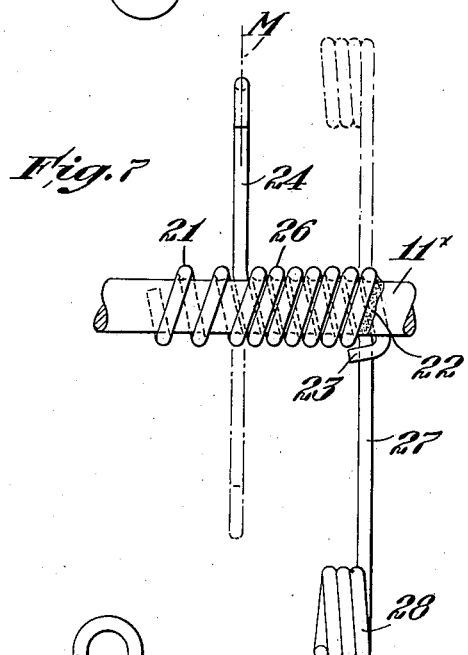
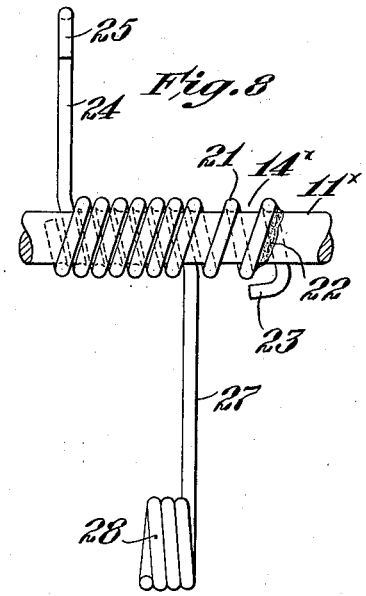
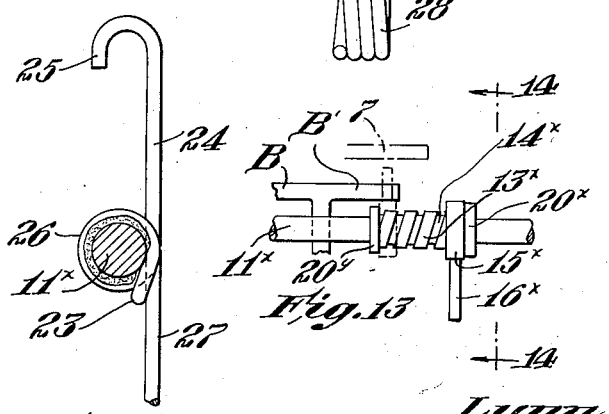
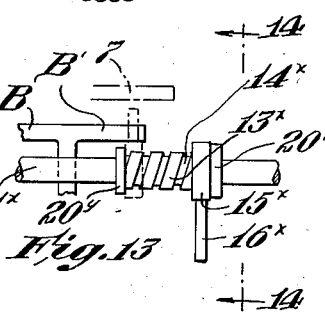
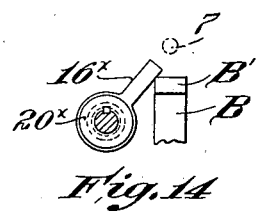
Inventors
Lynn H. Morse
Thomas F. Smith
by Roberts Cushman & Woodberry
Att'ys.

Patented Apr. 26, 1938

2,115,208

UNITED STATES PATENT OFFICE 2,115,208

GAS METER

Lynn H. Morse, Natick, and Thomas F. Smith, Atlantic, Mass., assignors to Morse, Lockhart & Morse, Inc., Cambridge, Mass., a corporation of Massachusetts Application January 8, 1937, Serial No. 119,590

23 Claims. (Cl. 73—275)

This invention pertains to measuring instruments and relates more particularly to fluid meters, for example gas meters such as are commonly employed for measuring heating or illuminating gas furnished to individual users. Since the customer is expected to pay for the gas in accordance with the amount consumed and since the meter reading is the only available indication of such amount, unscrupulous persons frequently attempt to interfere with the orderly operation of the meter so as to falsify its reading. One procedure which has been resorted to for this purpose consists in disconnecting the meter and reversing the connections between it and the supply and service pipes so that the meter runs backwards, thus subtracting the amount actually used from the previous reading of the meter. To prevent this practice, it has become customary to install a detent device within the meter box to prevent any substantial reversal of the meter parts. However, most such prior detent devices have included parts which contact at frequent intervals during the forward or normal movement of the meter mechanism, such contact resulting in an audible click. Formerly, when meters were generally installed in basements or other places remote from the living quarters, this clicking sound was not objectionable, but recent developments in housing frequently place the meter so close to the living quarters that noise from the meter becomes apparent and troublesome.

Furthermore, most prior detent devices permit, at most a single full reverse turn of the crank shaft of the meter before definitely stopping the meter, although under certain conditions it is preferable that the meter be free to turn backwardly more than one revolution of the crank shaft before stopping. For example, if the house or apartment be temporarily unoccupied so that gas is not being drawn from the supply, and the temperature within the house rises substantially, the gas confined in the service pipes expands but has no way of escape except backwardly through the meter into the supply main. However, if the meter parts can not turn backwardly or only to a very limited extent, the gas is trapped in the service pipe and its continued expansion may result in a pressure sufficient to cause dangerous leakage, if not actual rupture or permanent distortion of parts of the meter or the pipe fittings.

Principal objects of the present invention are to provide means operative to prevent unlimited reverse operation of the meter without occasioning objectionable sounds during normal operation, but capable of allowing a limited and predetermined reverse motion of the meter sufficient to take care of expansion of the gas in the service pipe.

Other objects of the invention are to provide a reverse device readily applicable to existing meters without requiring substantial change in the latter, and to provide a device of the class described which is durable and dependable, and which may be made and installed at a very low cost. Other objects and advantages of the invention will be more fully pointed out in the following detailed description wherein reference is made to the accompanying drawings in which Fig. 1 is a plan view of a meter box of conventional type having the top removed and embodying the stop mechanism of the present invention;

Fig. 2 is a fragmentary vertical section, to larger scale, substantially on the line 2—2 of Fig. 1;

Fig. 3 is a fragmentary transverse section substantially on the line 3—3 of Fig. 2, showing certain details of the index driving spindle;

Fig. 4 is a view similar to Fig. 3, illustrating a modified construction;

Fig. 5 is a fragmentary section, to larger scale, substantially on the line 5—5 of Fig. 1, omitting certain parts, and showing the stop device in its normal inoperative position;

Fig. 6 is a view similar to Fig. 5, illustrating the stop device in another position;

Fig. 7 is a fragmentary elevation, to larger scale, upon a plane such as that of the line 2—2 of Fig. 1, showing a modified form of stop device indicated as occupying the normal or inoperative position;

Fig. 8 is a view similar to Fig. 7 showing the stop device of the latter figure in its operative position;

Fig. 9 is an end elevation of the device of Fig. 7;

Fig. 10 is a view similar to Fig. 7, but illustrating a further modification, the parts being in the normal position occupied during the forward motion of the meter mechanism;

Fig. 11 is a view similar to Fig. 10, but showing the position of the parts when the meter has been reversed;

Fig. 12 is a fragmentary vertical section on the line 12—12 of Fig. 11;

Fig. 13 is a view similar to Fig. 7, but showing a further modification, the parts being indicated in full lines in the normal position occupied during forward movement of the meter mechanism, and the parts also being shown in the stopping position by dotted lines; and Fig. 14 is a fragmentary section on the line 14—14 of Fig. 13, showing the parts in the stopping position.

Referring to the drawings, the numeral 1 designates the outer casing of a gas meter of conventional type, such casing enclosing the usual bellows mechanism (not shown). The bellows mechanism is designed to actuate the rock arms 2 and 3 (Fig. 1) whose free extremities are connected by links 4 and 5, respectively, to a crank pin 6 adjustable longitudinally of an eccentrically disposed tangent or crank arm 7 carried by a vertical crank shaft 8, the arm 7 normally turning in a horizontal plane. The shaft 8, at its lower end (not shown), carries means for operating the controlling valves of the meter in the usual fashion.

The upper end of the crank shaft 8 turns in a bearing in a fixed bracket B and at a point below this bearing it is provided with a worm 9 which engages and drives a worm wheel 10 fixed to a substantially horizontal spindle 11 turning in suitable bearings carried by the casing. The forward end of this spindle 11 is connected to the drive shaft of the registering mechanism which extends into the box 12 in which are disposed indicating dials. All of the above parts are such as are commonly employed in commercial types of gas meter and form no essential part of the present invention, except in so far as they cooperate with the novel features now to be described.

In accordance with one embodiment of the present invention, a sleeve 13 (Figs. 2 and 3) is fixed to the spindle 11, preferably adjacent to the forward end of the latter, and this sleeve is provided with a peripheral helical groove 14 defining an actuating screw. A nut member 15 having an internal screw thread is mounted to turn on the sleeve 13 and is designed to travel longitudinally of the latter by reason of the cooperative engagement of the internal thread in the nut and the helical screw thread on the sleeve. This nut 15 constitutes part of the stop device which also comprises a stop arm 16 preferably having a hook portion 17 (Fig. 5) at its free end. In one embodiment of the device, it also includes an arm 18 diametrically opposite to the arm 16 and carrying a weight 19. As thus devised, the weight 19 tends to hold the stop device in the upright position illustrated in Fig. 5, and to cause the stop device to travel axially of the spindle 11 when the spindle is rotated. However, a suitable abutment, for example a pin 20, projecting from the spindle 11, or a suitable closure member at the end of the groove 14, is arranged to limit movement of the stop device toward the front of the meter, that is to say, to the right as viewed in Fig. 2. When the stop device has been arrested by engagement with this abutment and can no longer travel axially of the shaft to the right, as viewed in Fig. 2, it then partakes of the rotation of the spindle in the normal forward direction of the latter, the stop device then revolving in the vertical plane R (Fig. 2) and successively occupying positions such as shown in Figs. 5 and 6.

Normally the spindle 11 is driven at a substantially lower velocity than the crank shaft 8, the gear ratio provided between the worm 9 and the worm wheel 10 being commonly of the order of 5 to 1.

During the normal forward operation of the crank shaft 8, that is to say, during its rotation in the direction indicated by the arrow in Fig. 1, the free end of the crank arm 7 travels in the path P (Fig. 1) and in a substantially horizontal plane T (Fig. 2) which intersects the vertical plane R in which the stop device normally rotates. However, as may be noted by reference to Figs. 1 and 2, the actual path P of the end of the crank arm does not intersect the normal vertical plane R of rotation of the stop device.

However, if for any cause the crank shaft 8 be rotated in the reverse direction, with a corresponding reverse rotation of the spindle 11, the engagement of the nut 15 with the helical groove 14 causes the stop device to move to the left, as viewed in Fig. 2, away from the abutment 20. The rapidity of this movement will depend upon the pitch of the helical groove 14 and may be predetermined as desired by properly designing this groove. Ordinarily the pitch of the groove 14 will be such that the spindle will make several revolutions before the stop device has moved to the left far enough, that is to say into the vertical plane R' (Fig. 2), to cause its stop arm 16 to intersect the path of movement of the end of the crank arm 7. When it does intersect the path of movement of the crank arm, the hook 17 will engage the arm 7, and as the stop arm 16 is firmly anchored at its opposite end by its mounting on the spindle 11, any further rotation of the crank arm 7 is positively prevented and no further reverse movement of the meter is possible. As above noted, several turns of the spindle 11 will ordinarily be necessary in order to move the stop device to operative position, and thus a substantially longer period of reverse operation is provided for than though the stop device were to become operative at the end of a single turn of the spindle 11. By change in the pitch of the groove 14, it is thus possible to design the meter for reverse movement of greater extent than that corresponding merely to the speed ratio of the crank shaft and spindle.

After the meter has stopped, and as soon as it begins to move in the normal direction, the arm 7 begins to move away from the hook 17, and as the spindle 11 immediately begins to turn in the forward direction the nut 15 starts to travel toward the right in Fig. 2. Even though the arm 16, with its hook, may not be fully removed from the path of the crank arm, when the latter completes its first revolution, no harm results except one or more successive contacts of the arm 7 with the hook, the latter swinging freely in response to contact of the arm 7 and permitting the arm to pass over it. The stop device then continues to the right until it engages the abutment 20, whereupon it begins to rotate with the spindle 11, but without emitting any noise during the normal operation of the meter. It may be noted that during such normal operation, the stop device 16 is spaced a safe distance from the end of the crank arm 7 so that it can not contact with the latter. It may further be noted that by reason of the bodily removal of the stop device from the path of the arm 7, the latter is not subject to any retarding effect whatever during normal operation, such as results, to some degree at least, in meters provided with detent devices with which the crank arm contacts at every revolution.

Referring to Fig. 4, a modification is illustrated wherein the spindle 11 is provided with an integral cylindrical enlargement 13a instead of the separate sleeve 13 of Fig. 3, the helical groove 14a corresponding to the groove 14 being formed in the periphery of this enlargement 13a.

Referring to Figs. 7, 8 and 9, a modified form of stop device is illustrated. In these figures the spindle $11^x$ corresponding to the spindle 11, above described, is embraced by an open helical coil 21 of stiff wire constituting an actuating screw and whose turns define between them a helical groove $14^x$ corresponding to the groove 14, above described. This wire helix is fixed to the spindle $11^x$, for example, by means of solder 22 and its extreme forward end is preferably bent, as shown at 23, to form an abutment corresponding in function to that of the pin 20 previously described. The stop device consists of a length of wire formed to provide the stop arm 24, bent at its free end to form the crank-arm engaging hook 25. This length of wire also comprises an open helical coil 26 constituting a nut for cooperative engagement with the helical coil or screw thread 21. Preferably, this nut portion of the stop device merges with an arm 27 having a close coil 28 at its free end constituting a weight which tends to hold the stop device in the upright position illustrated in full lines in Figs. 7 and 8.

During the normal operation of the meter, the nut member 26 is disposed at the right-hand end of the helical coil 21, as shown in Fig. 7, with the arm 27 engaging the abutment 23. In this position of the parts, the entire stop device is constrained to rotate with the spindle $11^x$, the stop arm 24 turning in the vertical plane M which corresponds in position (with respect to the rest of the meter mechanism) to that of the plane R of Fig. 2. When the meter mechanism reverses, the reverse rotation of the spindle $11^x$ causes the nut 26 to travel to the left, as viewed in Figs. 7 and 8, until the stop arm 24 occupies the position shown in Fig. 8. This position corresponds to that of the plane $R^1$ of Fig. 2, in which the stop arm lies in the path of rotation of the crank arm 7. When thus positioned, the hook 25 catches the arm 7 and thus stops the meter mechanism. When the meter mechanism begins to move in the normal direction, the nut 26 is traversed to the right by the helix 21 until it resumes its normal position, as shown in Fig. 7.

In Figs. 10, 11 and 12 a further modification is illustrated, wherein the spindle $11^m$ is furnished with an open-coiled wire helix $21^m$ constituting the actuating screw, the coil being fixed to the spindle by solder or in any other suitable manner. In this construction the coil is provided with fixed abutments or limiting elements, such as the sharp bends or hooks $23^m$ and $23^n$, respectively, at its opposite ends. The stop device comprises a stop arm $24^m$ having a hook $25^m$ at its end, the arm being integral with an open coil $26^m$ constituting a nut which embraces the spindle $11^m$ and cooperates with the actuating screw $21^m$.

In the normal forward movement of the meter parts the stop arm $24^m$ occupies the position shown in Fig. 10, one end of its nut portion $26^m$ engaging the abutment $23^m$ whereby the stop arm is clutched to the spindle $11^m$ and rotates with the latter in the forward direction. However, when the meter mechanism is reversed, the reverse rotation of the spindle $11^m$ causes the nut member $26^m$ to move axially along the spindle to the left until the stop arm encounters the abutment $23^n$ which stops its axial movement. The stop arm is thereby, in effect clutched to the spindle so as to partake of the reverse rotation of the latter, and the stop arm is thus constrained to rotate in a vertical plane which intersects the path of rotation of the crank arm 7.

In order to ensure engagement of the hook $25^m$ with the crank arm 7, the bracket B is provided with an extension $B^1$ which intersects the vertical plane of rotation of the stop arm when the latter occupies the position of Fig. 11. Thus as the stop arm is rotated in the direction of the arrow of Fig. 12, it drops to the right, after passing the vertical plane of the spindle $11^m$, until it rests on the rigid bracket arm $B^1$, so that the hook $25^m$ is supported in the path of the arm 7. The proper stopping of the meter is thus assured.

In Figs. 13 and 14 a slight further modification is shown wherein the spindle $11^x$ is furnished with a cylindrical enlargement $13^x$ having a spiral groove $14^x$ defining an actuating screw with which cooperates the nut member $15^x$ having the stop arm $16^x$ rigidly projecting therefrom. In this instance the actuating screw is provided with limiting elements, for example, flanges or collars $20^x$ and $20^y$, respectively, at its opposite ends. Normally the stop arm $16^x$ occupies the position shown in full lines in Fig. 13, the nut $15^x$ engaging the abutment collar or flange $20^x$. In the forward rotation of the shaft $11^x$, such engagement of the nut with the abutment $20^x$ limits axial movement of the nut to the right and thus constrains it to turn with the spindle. When the spindle is reversed, the nut moves axially to the left until it encounters the abutment $20^y$ whereby it is constrained to turn in the reverse direction with the spindle $11^x$. In this position the plane of rotation of the arm is such that it encounters a rigid projection B' of the bracket B, and as the arm is at this time in effect clutched to the spindle, the latter is stopped even though the crank arm 7 does not encounter the stop arm $16^x$. Upon the next forward rotation of the spindle $11^x$ the stop arm will be traversed endwise of the spindle out of engagement with the abutment B', eventually reaching its original position as shown in full lines in Fig. 13. Obviously, the delive of Fig. 10 will operate similarly to that of Figs. 13 and 14, if the stop arm $24^m$ be so shortened that it does not reach up into the path of the crank arm 7 when in stopping position, although the engagement of the hooked end of the stop arm with the crank arm 7, as illustrated in Fig. 12, provides added certainty of operation.

While certain desirable embodiments of the invention have been herein disclosed and described in detail by way of example, it is to be understood that the invention is not necessarily limited to the precise construction shown, but is to be regarded as inclusive of all equivalents thereof such as fall within the scope of the appended claims.

We claim:

1. In a meter comprising operative mechanism including a shaft which normally turns in a predetermined direction, an eccentrically disposed part fixed to and turning with the shaft, a stop member normally disposed out of the path of rotation of said eccentrically disposed part, said stop member being bodily movable into and out of said path, and a helical actuating element operative upon reverse movement of the shaft to move the stop member bodily in a rectilinear path axially of the helical element into the path of said eccentrically disposed part.

2. In a meter comprising operative mechanism including a shaft which normally turns in a predetermined direction, an eccentrically disposed part fixed to and turning with the shaft, a stop member normally disposed out of the path of rotation of said eccentrically disposed part, said stop member being bodily movable into and out of said path, an actuating device normally rotating in timed relation to said shaft, said actuating device and the stop member being constructed and arranged to cooperate as a screw and nut, thereby, upon reverse movement of the shaft, to move the stop member bodily in a rectilinear path axially of the actuating device into the path of said eccentrically disposed part.

3. In a meter comprising operative mechanism including a shaft which normally turns in a predetermined direction, an eccentrically disposed part fixed to and turning with the shaft, a stop member normally disposed out of the path of rotation of said eccentrically disposed part, an actuating screw normally rotating in timed relation to said shaft, the stop member constituting a nut for said screw, and an abutment limiting motion of the stop member in one direction axially of the screw, the stop member turning with the screw when in engagement with the abutment, the parts being so constructed and arranged that upon reverse rotation of the shaft, the stop member is moved by the screw axially along the latter out of engagement with the abutment into the path of said eccentrically disposed part.

4. In a meter comprising operative mechanism including a shaft which normally turns in a predetermined direction, and a helical actuating element normally turning in timed relation to but at a lesser velocity than said shaft, a nut device cooperating with said helical element and movable axially of the latter in one direction or the other in accordance with the direction of rotation of said helical element, an abutment at each end of said helical element, the nut device being constrained to rotate with the helical element whenever it engages one or the other of said abutments, said helical actuating element being operative, upon reverse movement of the shaft and after a predetermined number of reverse rotations of the latter to dispose the nut device in contact with a predetermined one of said abutments and in a plane of rotation such that it encounters a part which can not move in said plane, thereby stopping reverse rotation of the nut device and the helical element.

5. In a meter comprising operative mechanism including a shaft which normally turns in a predetermined direction, an eccentrically disposed part fixed to and turning with the shaft, a stop member normally disposed out of the path of rotation of said eccentrically disposed part, an actuating screw normally rotating in timed relation to but at a predetermined less velocity than said shaft, said stop member constituting a nut for said screw, and movable lengthwise of the latter in one direction or the other in accordance with the direction of rotation of the screw, an abutment at each end of the screw, the stop member being constrained to turn with the screw whenever it engages one or the other of said abutments, the parts being so constructed and arranged that in response to reverse movement of the shaft and after a predetermined number of reverse rotations of the latter, the screw will position the stop member in contact with a predetermined one of said abutments and in a plane of rotation such that it encounters and stops further movement of said eccentrically disposed part.

6. In a metering device of the class described including a shaft which normally turns in a predetermined direction, an eccentrically disposed part fixed to and turning with the shaft, a stop member which normally turns freely in a plane intersecting the plane of rotation of said eccentric part, but out of the path of said latter part, means operative in response to reverse rotation of the shaft to shift the plane of rotation of said stop member until the latter intersects the path of said eccentric part, and means operative to prevent further rotation of said stop member when in the latter position.

7. In a metering device of the class described including a shaft which normally turns in a predetermined direction, an eccentrically disposed part fixed to and turning with the shaft, a stop member which normally turns about a fixed axis and in a plane which intersects the plane of rotation of said eccentric part but which lies out of the path of said part, and means operative, in response to reverse rotation of the shaft, to shift the stop member along said axis until its plane of rotation intersects the path of the eccentric part, and a hook member carried by the stop member and operative to engage said eccentric part and thereby to prevent further rotation of both the stop device and the eccentric part.

8. In a metering device of the class described including a shaft which normally turns in a predetermined direction, an eccentrically disposed element fixed to and turning with the shaft, a spindle which rotates in timed relation to the shaft but at a less velocity, an open coiled helix embracing the spindle, means securing the helix to the spindle, and a stop member comprising a stop arm and a nut, the latter cooperating with the helix, the stop member being normally adjacent to one end of the helix and out of the path of rotation of the eccentrically disposed element, the several parts being so devised and arranged that upon reverse rotation of the shaft the nut is traversed axially along the helix until the stop member is disposed in the path of the eccentric element.

9. In a metering device of the class described including a shaft which normally turns in a predetermined direction, an eccentrically disposed part fixed to and turning with the shaft, a spindle which rotates in timed relation with the shaft but at a less velocity, an open coiled helix embracing the spindle, means securing the helix to the spindle, and a stop member comprising a stop arm, a nut member which cooperates with the helix, and a weight which normally tends to prevent rotation of the nut with the spindle,—the stop member normally being disposed adjacent to one end of the helix and rotating therewith with its stop arm revolving in a plane which does not intersect the path of the eccentric part, the parts being so devised and arranged that upon reversal of rotation of the shaft, the nut is traversed axially along the helix until the stop arm lies in the path of rotation of the eccentric part, and means operative to prevent further rotation of the stop arm when in the latter position.

10. In a metering device of the class described including a shaft which normally turns in a predetermined direction, an eccentrically disposed part fixed to and turning with the shaft, a spindle which rotates in timed relation to the shaft, a helical actuating element coaxial with the spindle and turning therewith, and a stop member comprising a stop arm, a nut portion which cooperates with the helical actuating element, and a weight which normally tends to prevent rotation of the stop member with the spindle,—the stop member normally rotating with the spindle in a plane transverse to the plane of movement of the eccentric part but out of the path of said part, the several parts being so designed and arranged that upon reverse movement of the shaft the nut is traversed axially of the helix, thereby to place the stop arm in the path of the eccentric part, and means operative to prevent further rotation of the stop member when in the latter position.

11. In a metering device of the class described including a shaft which normally turns in a predetermined direction, an eccentrically disposed part fixed to and turning with the shaft, a spindle which rotates in timed relation to the shaft, an open coiled helix embracing the spindle, means securing the helix to the spindle, one terminal of the helix being provided with an abutment, and a stop member comprising a length of wire including a hooked arm, an open coiled helical portion cooperating as a nut with the aforesaid helix, and a depending arm having a weight at its lower end,—the nut portion of the stop member embracing the spindle and having its turns interposed between the coils of the helix, said nut portion normally being disposed at one end of the helix with its weighted arm in contact with the abutment whereby the stop arm is constrained to rotate with the spindle in a plane which does not intersect the path of the eccentric part, the parts being so devised and arranged that upon reverse movement of the shaft the nut travels axially of the helix until the hooked arm of the stop member is disposed in the path of and engages the eccentric part.

12. In a metering device of the class described including a shaft which normally turns in a predetermined direction, an eccentrically disposed part fixed to and turning with the shaft, a spindle which rotates in timed relation to said shaft, a stop member mounted upon said spindle, means constraining the stop member to rotate with the spindle so long as the shaft turns in the normal direction, the normal plane of rotation of the stop member intersecting the plane of rotation of said eccentric part but being out of the path of said part, means operative in response to reverse rotation of the shaft to shift the stop member along the spindle until its plane of rotation intersects the path of the eccentric part, means operative to clutch the stop member to the spindle when in the latter position, and means to limit rotation of the stop member when so clutched to the spindle, thereby to stop the spindle and shaft.

13. In a metering device of the class described including a shaft which normally turns in a predetermined direction, an eccentrically disposed part fixed to and turning with the shaft, a spindle which rotates in timed relation to said shaft, a stop member mounted upon said spindle, the stop member normally rotating with the spindle in a plane which does not intersect the path of said eccentric part, and a helical element operative in response to reverse movement of the shaft to shift the stop member bodily along the spindle until it is positioned in a plane which does intersect the path of rotation of the eccentric part, and means operative to stop rotation of the stop member when in said latter plane.

14. In a metering device of the class described including a shaft which normally turns in a predetermined direction, an eccentrically disposed part fixed to and turning with the shaft, a rotatable stop member, means supporting the stop member for axial movement, the stop member normally being disposed to rotate in a plane which does not intersect the path of rotation of the eccentric part, and a helical actuating element, the stop member comprising a part which cooperates as a nut with said helical element, the parts being so designed and arranged that upon reverse movement of the shaft the helical actuating element traverses the stop member bodily in an axial direction until it lies in the path of the eccentric part, and means to stop further rotation of the stop member when it occupies the latter position.

15. In a meter of the class described, including a crank shaft provided with a crank arm and crank pin, means for turning the crank shaft in a predetermined normal direction, a register-actuating spindle turning in timed relation to the crank shaft, a screw thread element on the spindle, a stop device comprising a nut portion engaging said screw thread element, a stop arm and a weight,—the weight normally tending to prevent rotation of the stop device with the spindle, abutment means with which the nut normally engages to limit movement of the stop device in one direction along the spindle, the stop device normally turning with the spindle in a plane which does not intersect the path of the crank arm, the parts being so designed and arranged that when the crank shaft turns in reverse direction the nut is traversed axially along the spindle by the screw thread element until the stop arm stands in the path of the crank arm, and means operative to prevent further rotation of the stop device when in the latter position.

16. In a meter of the class described, including a crank shaft provided with a crank arm and crank pin, means for turning the crank shaft in a predetermined normal direction, a register-actuating spindle turning in timed relation to the crank shaft but at a predetermined lesser velocity, a stop device so mounted on the spindle as to be movable axially of the latter, the stop device being normally positioned out of the path of the crank arm, and stop shifting means operative during reverse movement of the crank shaft to shift the stop member along the spindle toward the path of the crank arm, said stop shifting means being so constructed and arranged as only to position the stop member in the path of the crank arm after the crank shaft has made a number of reverse turns substantially greater than that corresponding to the ratio of velocity of the crank shaft and spindle.

17. In a meter of the class described, including a crank shaft provided with a crank arm and crank pin, means for turning the crank shaft in a predetermined normal direction, a register actuating spindle turning in timed relation to the crank shaft, but at a predetermined lesser velocity, a stop device movable longitudinally of the spindle but normally located out of the path of the crank arm, and means including a screw thread of predetermined pitch operative, when the crank shaft has completed a number of reverse turns greater than that corresponding to the velocity ratio of the crank and spindle, to dispose the stop device in the path of the crank arm.

18. In a meter comprising operative members including a driven shaft, a spindle, connections between the shaft and spindle whereby the spindle turns at a slower speed than the shaft, a screw thread element carried by the spindle, a stop device including a nut element cooperable with the screw thread element and movable longitudinally of the spindle in one direction or the other in accordance with the direction of movement of the spindle, limiting means operative to limit movement of the stop device lengthwise of the spindle in one direction, at least, the stop device turning with the spindle when it encounters such limiting means, and means engageable by the stop device, when the latter contacts the limiting means, to prevent rotation of the stop device and thereby to stop the spindle and shaft.

19. In a meter comprising meter mechanism including a shaft and means normally driving the shaft in a forward direction, a screw thread element carried by the shaft, a member which is movable axially of the shaft but which normally occupies a position adjacent to one end of the screw thread element and which rotates freely with the shaft when so positioned, said member comprising a screw-thread-engaging part cooperable with the screw thread element to traverse said member bodily along the shaft when the shaft is reversely rotated, and means disposed for engagement by said member, after a predetermined movement of the latter along the shaft away from its normal position, thereby to stop further reverse rotation of the shaft.

20. In a meter comprising meter mechanism including a shaft and means normally turning said shaft in a forward direction, a member arranged to move axially of said shaft and which turns with said shaft when at one limit of its axial movement, so long as the shaft turns in normal forward direction, means operative, upon reverse rotation of said shaft, to move said member toward the other limit of its axial movement, and a part with which said member engages when adjacent to the last-named limit of movement and which is constructed and arranged, by engagement with said member, to stop rotation of the shaft.

21. In a meter comprising meter mechanism including shafts driven at different speeds, a member arranged to move axially of one of said shafts and which turns with said shaft when at one limit of its axial movement so long as the shaft turns in the normal forward direction, a screw thread element carried by the latter shaft, said screw thread element being operative, upon reverse rotation of the shaft on which it is mounted, to move said member toward its other limit of movement, and a part normally turning with the other shaft and with which said member engages when adjacent to its latter limit of movement, thereby to stop rotation of both shafts.

22. In a meter comprising meter mechanism including shafts driven at different speeds, a nut arranged to move axially of one of said shafts and which turns with said shaft when at one limit of its axial movement so long as the shaft turns in the normal forward direction, a screw thread element on said latter shaft with which the nut cooperates when the shaft is reversely rotated, thereby to move said nut toward the other limit of its axial path of movement, and a part with which a portion of said nut engages when adjacent to the latter limit of its path of movement, thereby to stop reverse rotation of both shafts.

23. In a meter comprising mechanism including a shaft having a crank arm fixed thereto, a second shaft driven by the first, a screw-thread element on one of said shafts, a stop device mounted to turn about the axis of the latter of said shafts, said stop device comprising a stop member normally positioned out of the path of the crank arm, said stop device also including a portion which, upon reversal of the meter mechanism, cooperates as a nut with the screw-thread element so as to be moved axially of the latter and thereby move the stop member into the path of the crank arm.

LYNN H. MORSE.
THOMAS F. SMITH.